US012237594B2

(12) United States Patent
Lin et al.

(10) Patent No.: US 12,237,594 B2
(45) Date of Patent: Feb. 25, 2025

(54) ELECTRICAL CONNECTOR ASSEMBLY HAVING IMPROVED LOCKING ELEMENTS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Xiao-Juan Lin, Kunshan (CN); Chun-Hsiung Hsu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 213 days.

(21) Appl. No.: 17/702,020

(22) Filed: Mar. 23, 2022

(65) Prior Publication Data

US 2023/0307870 A1 Sep. 28, 2023

(51) Int. Cl.

| | |
|---|---|
| ***H01R 12/51*** | (2011.01) |
| ***H01R 12/70*** | (2011.01) |
| ***H01R 13/08*** | (2006.01) |
| ***H01R 13/502*** | (2006.01) |
| ***H01R 13/627*** | (2006.01) |
| ***H01R 13/629*** | (2006.01) |

(Continued)

(52) U.S. Cl.

CPC ....... *H01R 12/515* (2013.01); *H01R 12/7023* (2013.01); *H01R 13/08* (2013.01); *H01R 13/502* (2013.01); *H01R 13/6273* (2013.01); *H01R 13/629* (2013.01); *H01R 13/639* (2013.01); *H01R 2107/00* (2013.01)

(58) Field of Classification Search

CPC ............ H01R 13/6273; H01R 12/7023; H01R 13/6582; H01R 13/08; H01R 13/502; H01R 13/629; H01R 13/639; H01R 12/515; H01R 2107/00

USPC ............ 439/352, 357, 607.35, 607.36, 607.4

See application file for complete search history.

(56) References Cited

U.S. PATENT DOCUMENTS 5,921,814 A * 7/1999 Maruyama ........... H01R 13/658 439/607.35
8,921,236 B1 * 12/2014 Ellinger .................. H01L 21/32 438/762

(Continued)

FOREIGN PATENT DOCUMENTS

CN 213753128 U 7/2021

*Primary Examiner* — Gary F Paumen
(74) *Attorney, Agent, or Firm* — Ming Chieh Chang

(57) ABSTRACT

A board connector includes a first housing including a base and two sidewalls and defining a receiving space, a plurality of first terminals and a first metallic shell including a first main portion and two extending portions extending from the first main portion and fitting covering outsides of the sidewalls. Each extending portion defines a locking hole. A cable connector includes a second housing, a plurality of second terminals and a second metallic shell comprising a second main portion covering a top of the second insulating housing and a pair of locking arms extending from the second main portion in the lateral direction. Each sidewall is sandwiched between the locking arm and an outside of the second housing and each locking arm is retained in the locking hole during the cable connector is engaged with the board connector.

3 Claims, 9 Drawing Sheets

(51) Int. Cl.
*H01R 13/639* (2006.01)
*H01R 107/00* (2006.01)

(56) References Cited

U.S. PATENT DOCUMENTS

| | | | | |
|---|---|---|---|---|
| 9,991,631 | B2 * | 6/2018 | Zhao | H01R 13/6273 |
| 10,907,816 | B2 | 2/2021 | Kato et al. | |
| 11,381,035 | B2 * | 7/2022 | Zhu | H01R 13/6273 |
| 2006/0234530 | A1 * | 10/2006 | Chung | H05K 3/341<br>439/79 |
| 2018/0040977 | A1 | 2/2018 | Zhao et al. | |
| 2020/0403355 | A1 | 12/2020 | Zhu et al. | |

* cited by examiner

ELECTRICAL CONNECTOR ASSEMBLY HAVING IMPROVED LOCKING ELEMENTS

BACKGROUND OF THE INVENTION

1. Field of the Invention

The present invention relates to an electrical connector assembly including a board connector and a cable connector mating with each other.

2. Description of Related Arts

US20180040977A1 discloses an electrical connector assembly including a board connector and a cable connector mating with each other. The board connector includes an insulating housing and conductive terminals retained in the housing, the housing includes a rear wall or base and two sidewalls extending forward from the base, commonly defining a receiving space opening forwards and upwards, the terminals are retained in the base and protrude into the receiving cavity. Each sidewall is provided with an elastic locking arm, which unitarily extends from the sidewall resulting in increasing the complexity of manufacture.

Therefore, an improved electrical connector assembly is desired to overcome the disadvantages of the prior arts.

SUMMARY OF THE INVENTION

An object of the present invention is to provide an electrical connector assembly, a board connector and a cable connector with improved locking elements.

In order to achieve above-mentioned object, an electrical connector assembly comprises a board connector and a cable connector. The board connector comprises a first insulating housing comprising a base and two sidewalls extending forward from the base and defining a receiving space among the base and the sidewalls; a plurality of first terminals retained in the base and extending into the receiving space; and a first metallic shell comprising a first main portion and two extending portions extending from the first main portion and fitting covering outsides of the sidewalls, each extending portion defining a locking hole. The cable connector comprises a second insulating housing; a plurality of second terminals retained in the second insulating housing and arranged along a lateral direction, a second metallic shell comprising a second main portion covering a top of the second insulating housing and a pair of locking arms extending from the second main portion in the lateral direction. Each sidewall of the board connector is sandwiched between the locking arm and an outside of the second insulating housing of the cable connector and each locking arm is retained in the locking hole during the cable connector is engaged with the board connector.

Other objects, advantages and novel features of the present invention will become more apparent from the following detailed description of the present embodiment when taken in conjunction with the accompanying drawings.

DETAILED DESCRIPTION OF THE PREFERRED EMBODIMENTS

Figure 1:
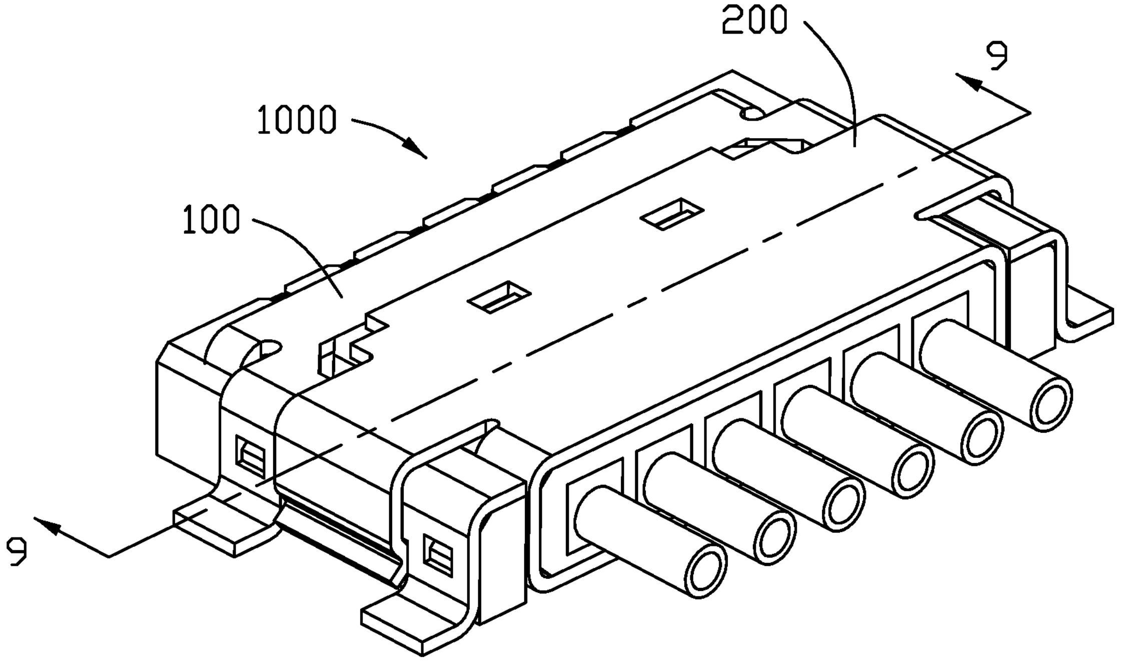
FIG. 1 is a perspective view of an electrical connector assembly including a board connector and a cable connector mating with each other in accordance with the present invention.

Reference will now be made to the drawing figures to describe the preferred embodiment of the present invention in detail.

Referring to FIGS. 1 to 4, an electrical connector assembly 1000 includes a board end electrical connector or board connector 200 and a cable end electrical connector or cable connector 200 mating with each other. The two connectors are locking with each other by locking elements formed by metallic shells which will depict thereinafter.

Figure 5:
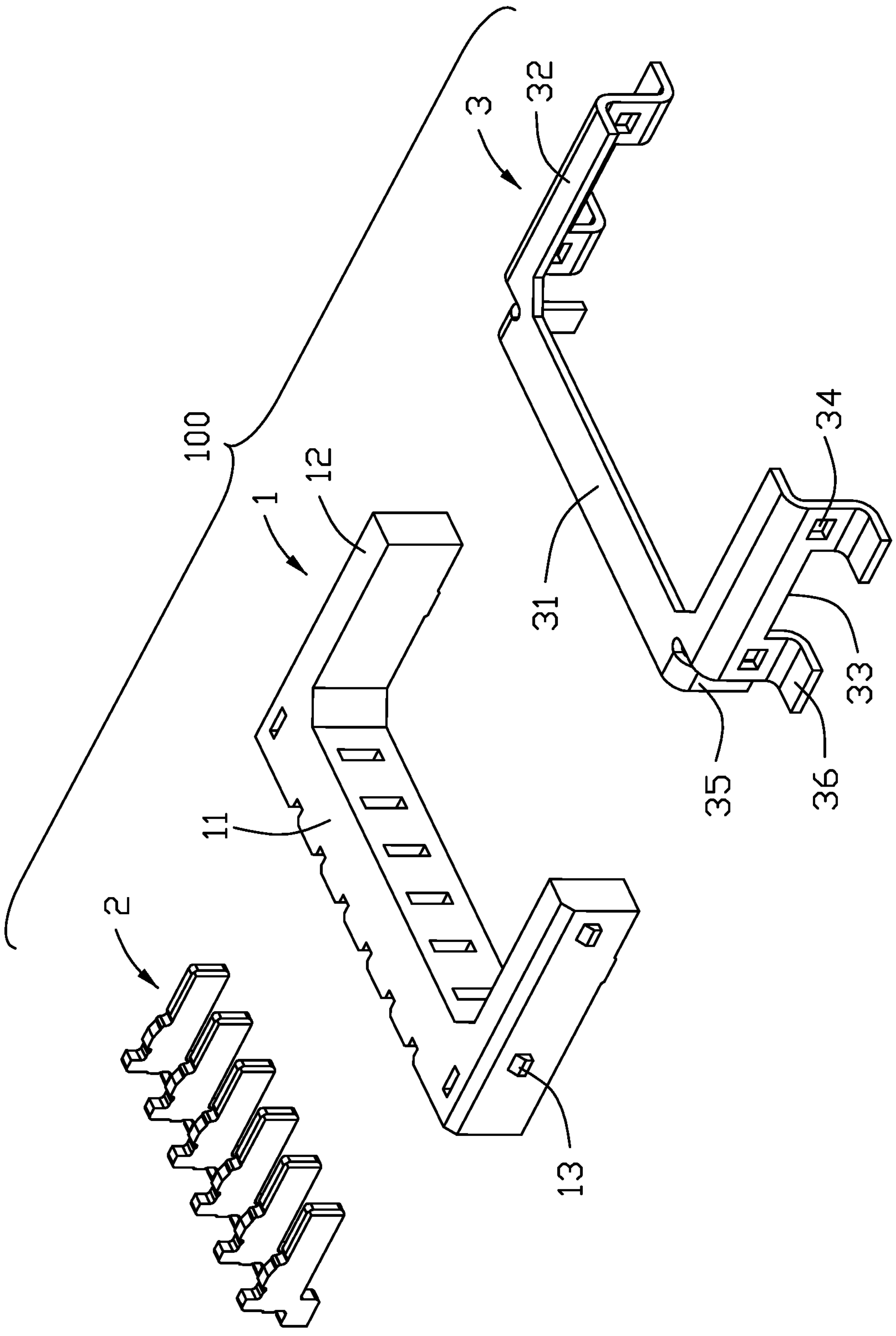
FIG. 5 is an exploded perspective view of the board connector in FIG. 3.
Figure 6:
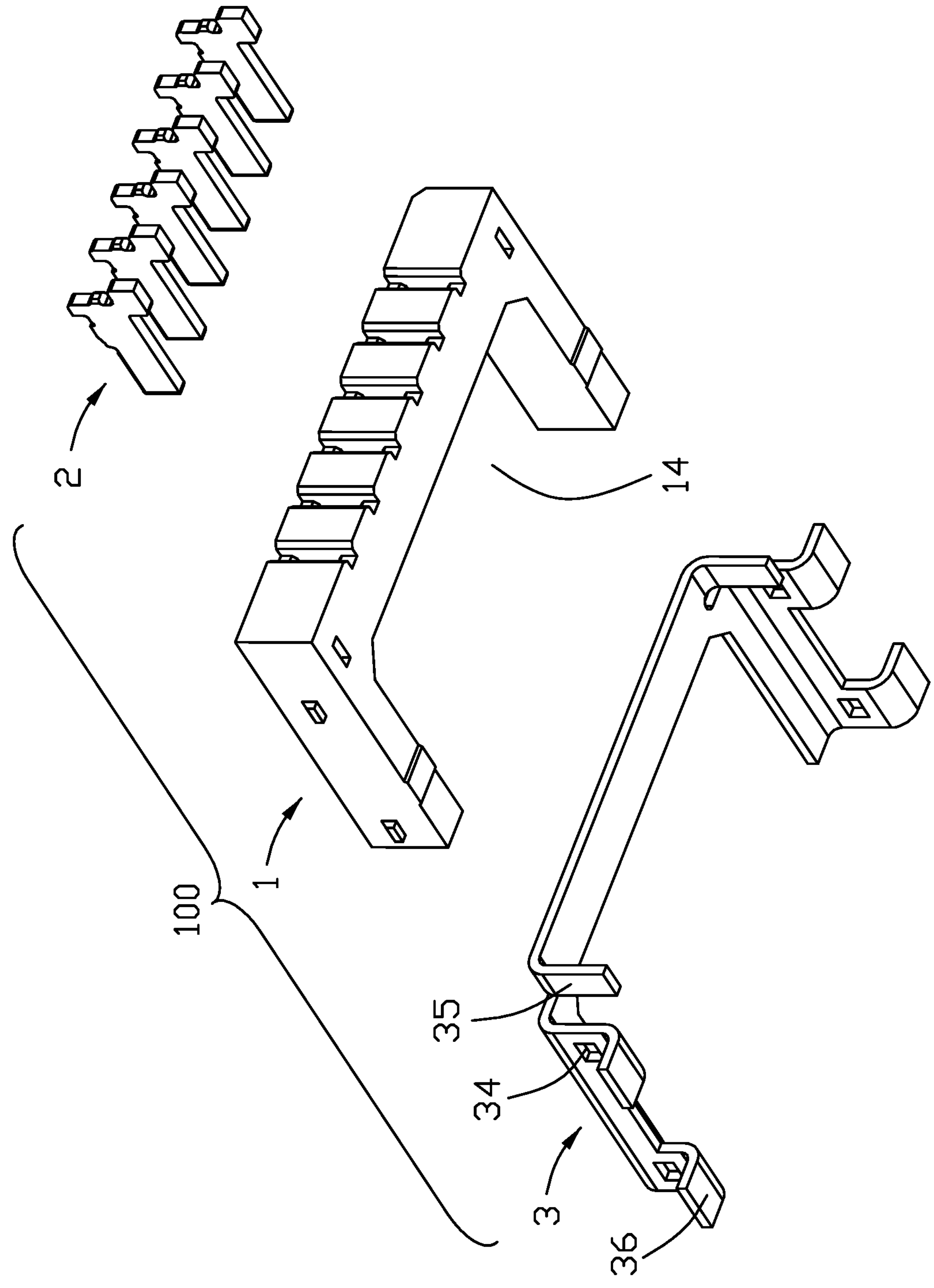
FIG. 6 is another perspective view of the board connector in FIG. 5.

Referring to FIGS. 5 and 6, the board connector 100 includes a first insulating housing 1, a plurality of first terminals 2 retained in the first housing 1 and a first metallic shell 3. The first housing 1 includes a rear wall or a base 11 and two sidewalls 12 extending forward from the base 11, and a receiving space 14 is commonly defined among the base 11 and the sidewall 12, for receiving the mating connector, that is a connector-receiving space. The first terminals 2 are retained in the base 11 and protrude into the receiving space 14. The first shell 3 fitly covers the outsides of the two sidewalls 12 and defines a hole 33 opening downward. The outsides of the sidewalls 12 are partially exposed upon the holes 33. Therefore, a locking hole is defined in the hole 33, an inner edge facing downwards is defined as a locking edge. The first terminals 2 are of a blade shape.

The first shell 3 includes a first main portion 31 and two extending portions 32 extending forwards from the first main portion 31, the first main portion covers a top face of base 11 and the extending portions cover top faces and the outsides of the sidewalls 12. The sidewall 12 defined two retaining bumps 13 protruding laterally or outwards from the outside thereof, and the extending portion 32 defines two openings 34 which are locked or retained with the retaining bumps 34. The first shell 3 is assembled to the first housing 1 from top face in an upright direction. The first shell 3 defines a pair of soldering portions 36 extending from the lower edge thereof for being soldered with the PCB, which are located at opposite sides of the holes 33 in the front and rear direction. The soldering portions 36 are located under the openings 34. A fitting portion 35 bending downward from the first main portion 31 and behind the extending portion 32, are inserted and retained in the first housing 1. The fitting portions 35 are located at an inner side of the holes 33 viewed from the front and rear direction.

Figure 7:
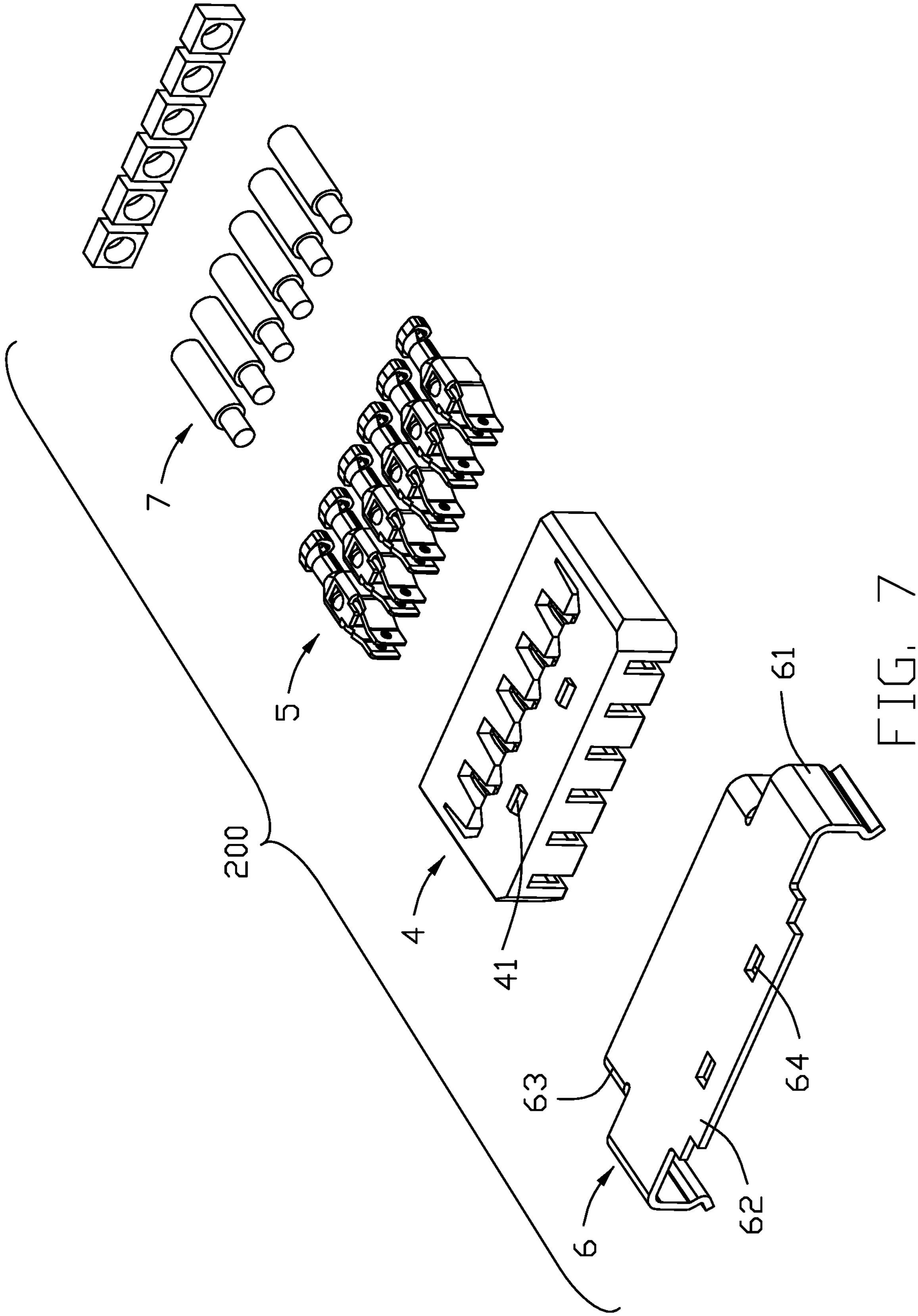
FIG. 7 is an exploded perspective view of the cable connector in FIG. 3.
Figure 8:
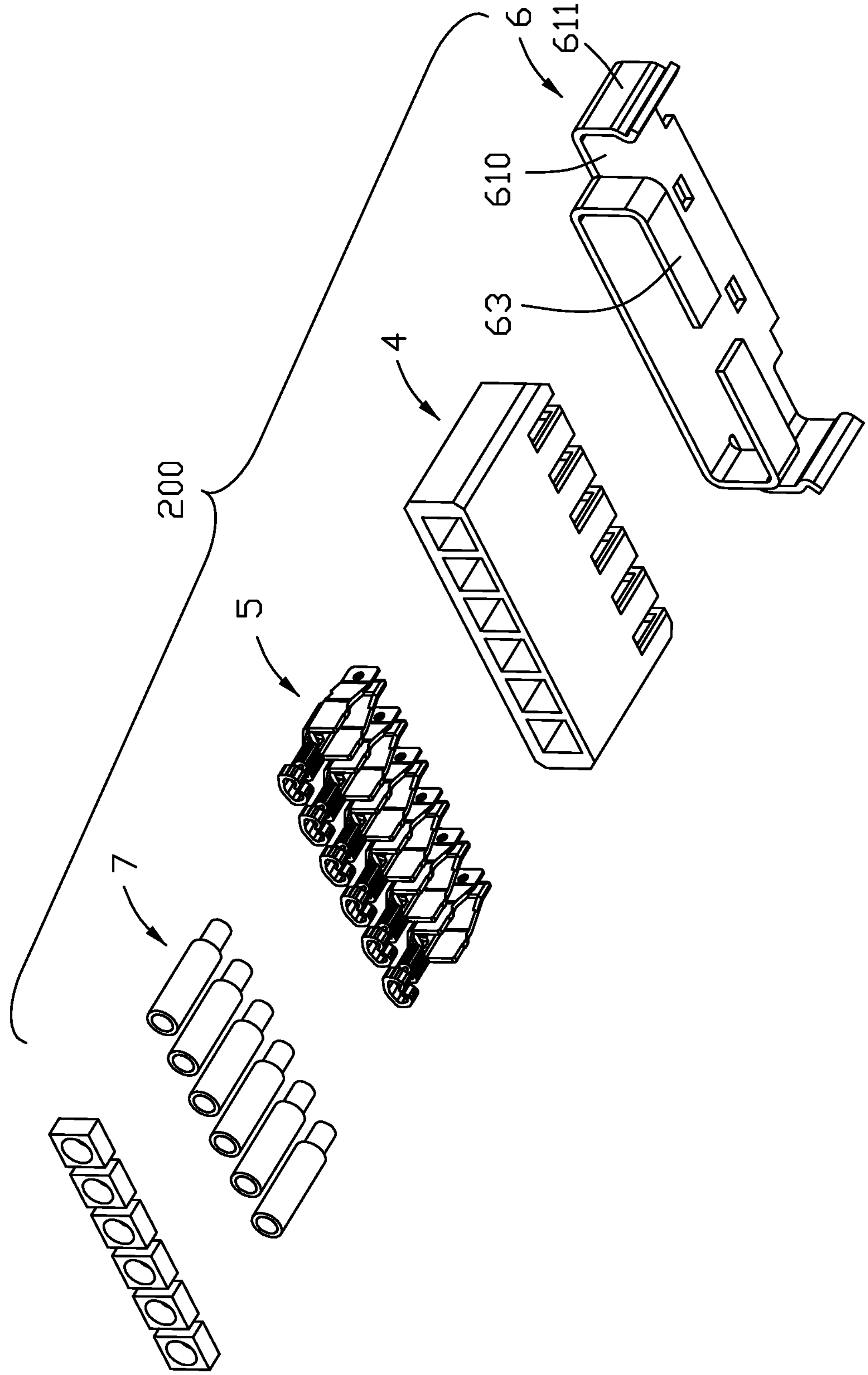
FIG. 8 is another perspective view of the cable connector in FIG. 7.

Referring to FIGS. 7 and 8, the cable connector 200 is connecting with cables 7 and includes a second insulating housing 4, a plurality of second terminals 5 and a second metallic shell 6. The second shell 6 includes a second main portion 62 and a pair of locking arms 61 extending from opposite ends of the second main portion 62 along a lateral direction of the cable connector. The locking arm 61 includes linking portion 610 unitarily linking with lateral edge of the second main portion 62 and a locking portion 611 bending downward from the linking portion 610. The locking portions 611 separates from corresponding lateral outside of the second housing 2 with a locking space therebetween, for locking with the locking holes of the board connector 100. The second housing 1 defines bumps 41 on the top face thereof, to engage with the openings 64 defined on the second shell 6.

The second shell 6 includes an embracing portion 63 bending from the second main portion 61 and located behind the locking arms 61, which embraces a rear portion of the second housing 4. In this embodiment, the embracing portion 63 is substantially aligned with the second housing 4 at rear edges.

Figure 2:
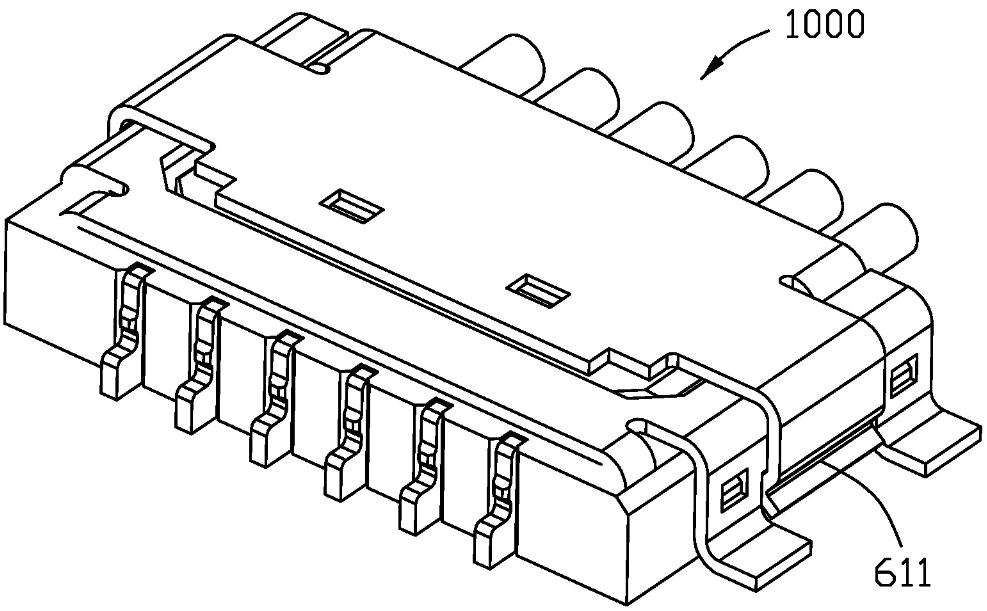
FIG. 2 is another perspective view of the electrical connector assembly in FIG. 1.
Figure 3:
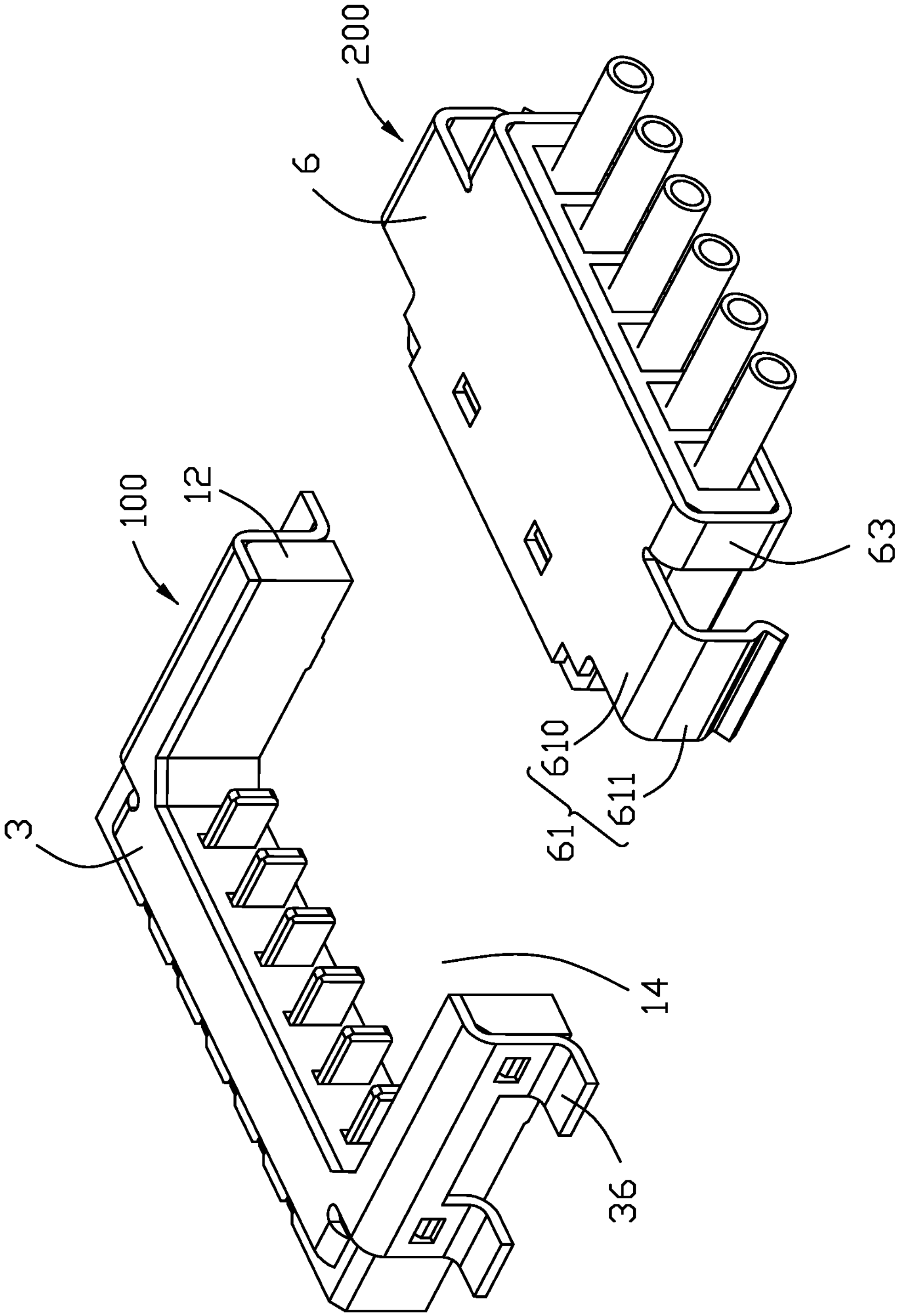
FIG. 3 is a perspective view of an electrical connector assembly, wherein the board connector and the cable connector disconnect from each other of FIG. 1.
Figure 4:
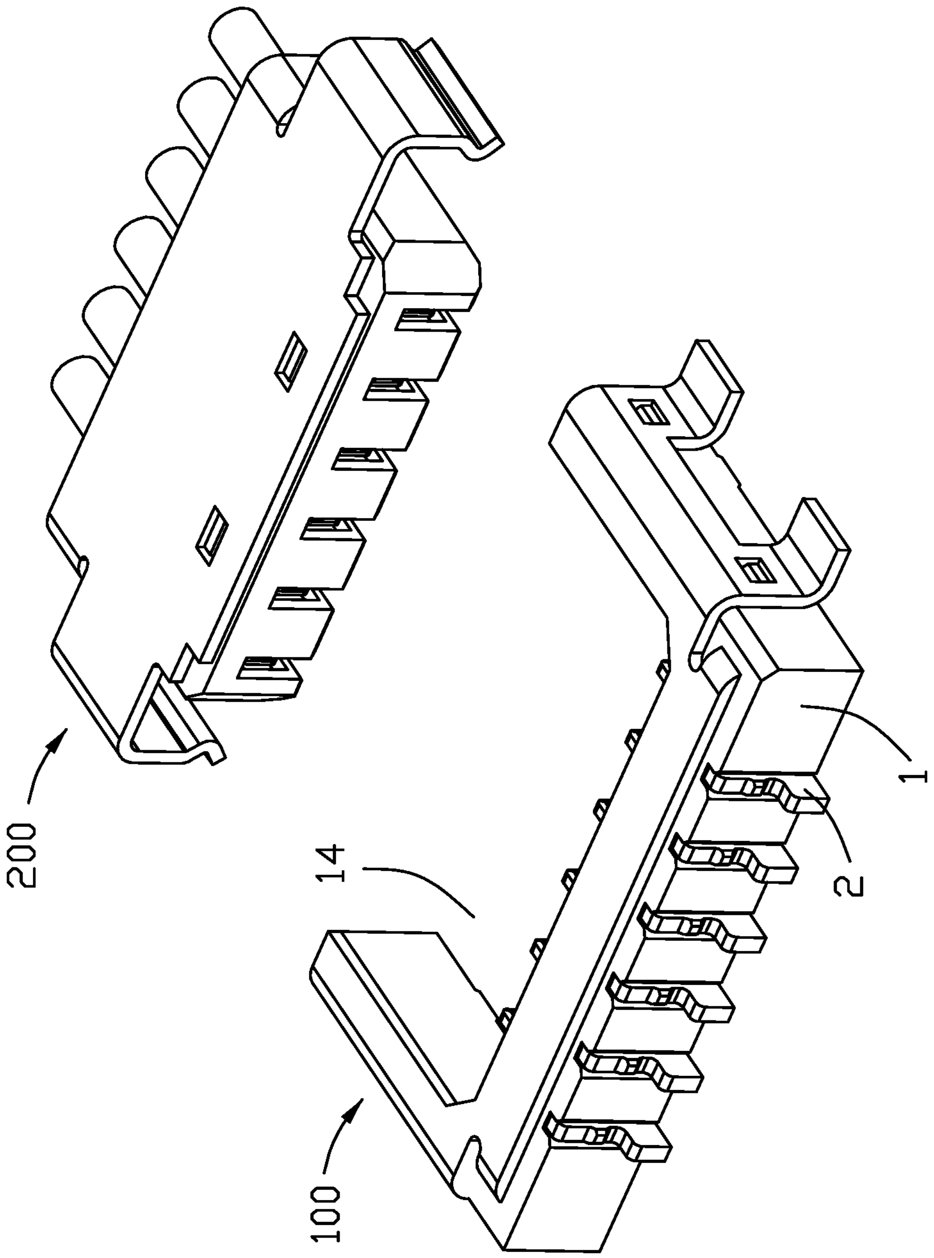
FIG. 4 is another perspective view of the electrical connector assembly in FIG. 3.
Figure 9:
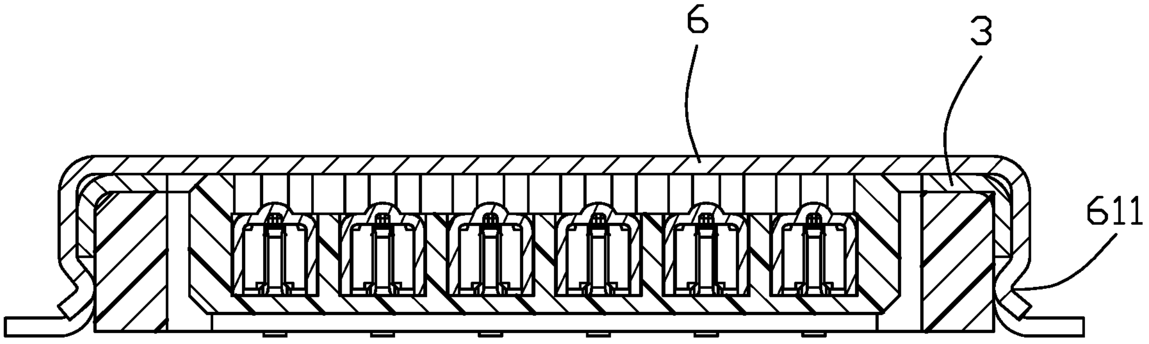
FIG. 9 is a cross sectional view of the electrical connector assembly taken along line 8-8 in FIG. 1.

Referring to FIGS. 1 and 2 illustrating an engagement of the board connector 100 and the cable connector 200, the cable connector 200 is inserted and received in the receiving space 14 of the board connector 100, especially the embracing 63 is received in the receiving space 14 and located between the two sidewalls 12. Each sidewall 12 is sandwiched between the locking arm 61 and the outside of the outside of the second housing 6. Referring to FIG. 9, the locking arms 61 are locked in the holes 33 and retained with the outsides of the sidewalls 12. Therefore, the first and second insulating housing is simplified and the feel of the connection and disconnection of the two connectors is increase.

However, the disclosure is illustrative only, changes may be made in detail, especially in matter of shape, size, and arrangement of parts within the principles of the invention.

What is claimed is:

1. An electrical connector assembly comprising:

a board connector comprising:

a first insulating housing comprising a base and two sidewalls extending forward from the base and defining a receiving space among the base and the sidewalls;

a plurality of first terminals retained in the base and extending into the receiving space; and a first metallic shell comprising a first main portion and two extending portions extending from the first main portion and covering outsides of the sidewalls, each extending portion defining a locking hole; and a cable connector adapted for mating with the board connector, the cable connector comprising:

a second insulating housing;

a plurality of second terminals retained in the second insulating housing and arranged along a lateral direction; and a second metallic shell comprising a second main portion covering a top of the second insulating housing and a pair of locking arms extending from the second main portion in the lateral direction;

wherein each sidewall of the board connector is sandwiched between the locking arm and an outside of the second insulating housing of the cable connector and each locking arm is retained in the respective locking hole while the cable connector is engaged with the board connector.

2. The electrical connector assembly as claimed in claim 1, wherein the locking arm is engaged with an outside of a part of the respective sidewall of the board connector exposed upon the locking hole.

3. The electrical connector assembly as claimed in claim 1, wherein each locking hole opens downward.

* * * * *